United States Patent [19]

Edwards

[11] 4,126,720
[45] Nov. 21, 1978

[54] RADIAL TIRE MANUFACTURING METHOD

[76] Inventor: George R. Edwards, 5818 Brittany Woods Cir., Louisville, Ky. 40222

[21] Appl. No.: 688,905

[22] Filed: May 21, 1976

[51] Int. Cl.² .......................... B29H 9/04; B29H 9/08; B29H 15/00; B29H 15/04
[52] U.S. Cl. ............................ 428/294; 152/357 R; 156/117; 156/118; 156/122; 156/174; 156/187; 428/238; 428/285
[58] Field of Search ...................... 156/87, 110 R, 117, 156/118, 121, 122, 123, 124, 133, 143, 173, 174, 175, 187, 195, 244, 286, 287, 130, 397, 425, 426, 427, 428-431, 437, 503; 152/357 R, 354 R, 355, 356 R; 428/224, 238, 285, 292, 294

[56] References Cited

U.S. PATENT DOCUMENTS

| | | | |
|---|---|---|---|
| 1,453,217 | 4/1923 | Weigel | 152/357 |
| 1,519,522 | 12/1924 | Weigel | 152/357 |
| 2,623,571 | 12/1952 | Webber | 156/122 |
| 2,656,873 | 10/1953 | Stephens | 156/175 |
| 2,692,005 | 10/1954 | De Cloud | 156/117 |
| 3,375,150 | 3/1968 | Alexeff | 156/117 |
| 3,607,497 | 9/1971 | Chrobak | 156/96 |
| 3,778,329 | 12/1973 | Alderfer | 156/124 |
| 3,881,974 | 5/1975 | de Zarauz | 156/124 |
| 3,954,538 | 5/1976 | Grawey | 156/117 |

FOREIGN PATENT DOCUMENTS 496,205  9/1953  Canada .................................. 156/117

*Primary Examiner*—John E. Kittle
*Attorney, Agent, or Firm*—Spencer & Kaye

[57] ABSTRACT

A method of forming a reinforcing fabric and in particular a body ply for a radial tire. A continuous narrow ribbon, which is formed of an uncured elastomeric material having a plurality of spaced substantially parallel reinforcing means, preferably individual steel filaments, embedded in the elastomeric material and extending along the length of the ribbon, is helically wound on a cylindrical drum with successive turns of the ribbon overlapping one another to form a cylinder whose wall thickness is greater than the thickness of the ribbon. The helical winding of the ribbon is continued until the length of the wound cylinder is approximately equal to the circumference of the bead of the radial tire to be produced. The wound ribbon is removed from the drum, flattened to form a sheet of material of the length of the wound cylinder, formed into a further cylinder whose longitudinal axis is transverse to the longitudinal axis of the sheet, and the two juxtaposed ends of the sheet are joined to form the body ply of the radial tire.

19 Claims, 9 Drawing Figures

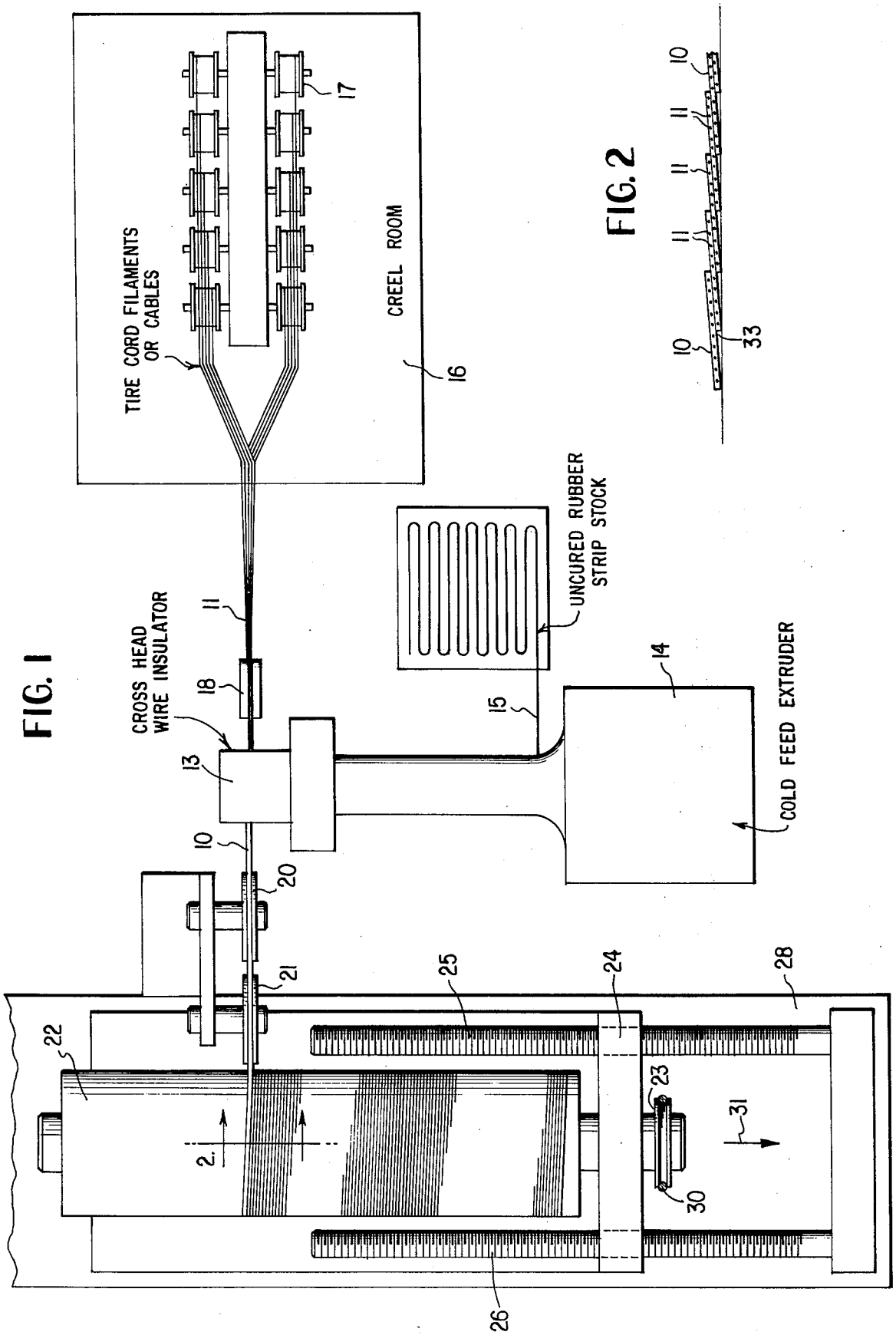

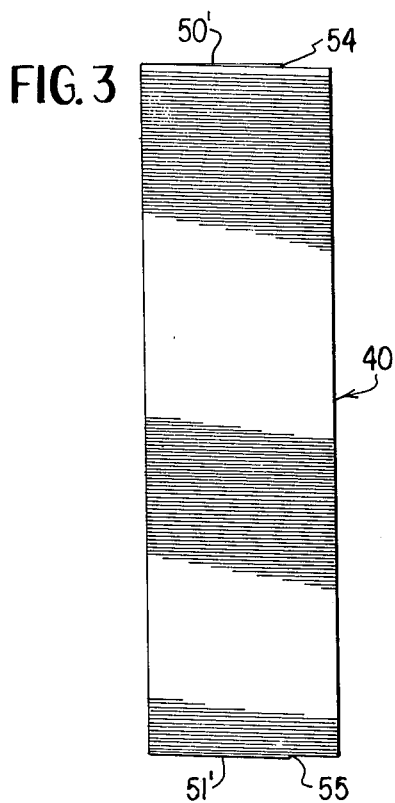
FIG. 3
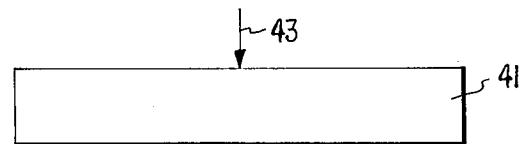
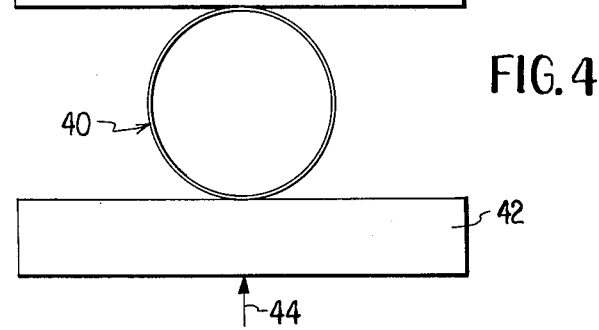
FIG. 4
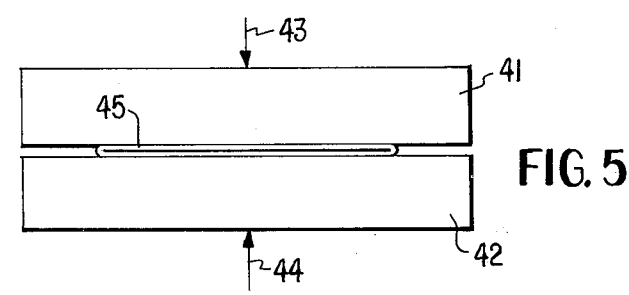
FIG. 5
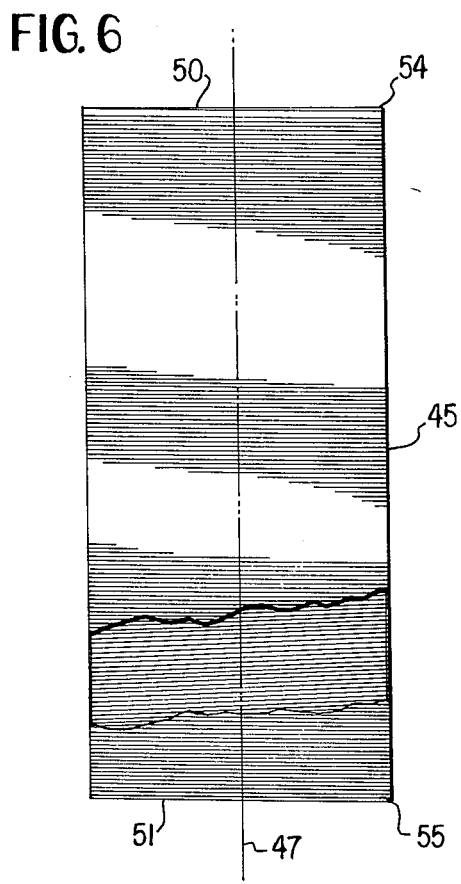
FIG. 6
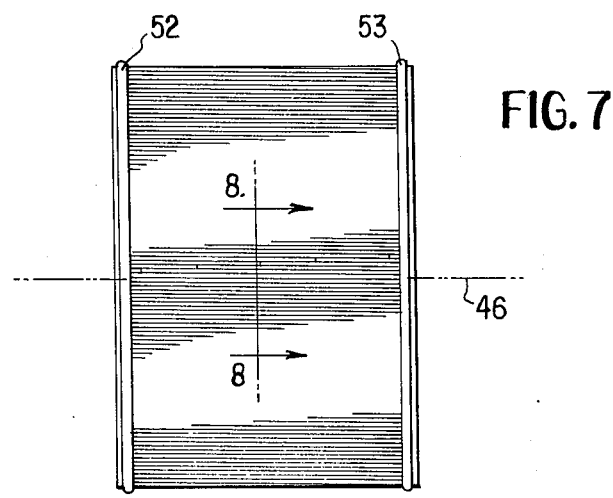
FIG. 7
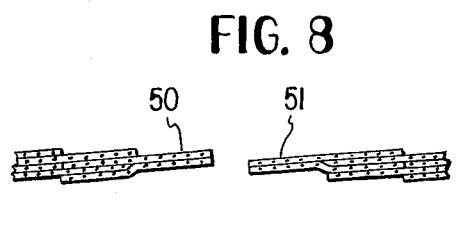
FIG. 8

RADIAL TIRE MANUFACTURING METHOD

BACKGROUND OF THE INVENTION

The present invention relates to a method for manufacturing a reinforcing fabric for a pneumatic tire. More particularly, the present invention relates to a method for constructing the body ply of a radial tire.

The body ply of a radial tire is generally composed of equally spaced cords or cables, which are disposed at substantially 90° to the bead wires of the tire, and which are encased in an elastomeric material, generally rubber. Tire cords or cables are generally composed of a material such as rayon, nylon, polyester, fiber glass or steel and the individual tire cords or cables are generally constructed by twisting, stranding or bundling a plurality of fine filaments of one of these materials. For example, the number of individual filaments used to make up a single tire cord could range from 5 to 50 filaments.

In order to obtain the proper strength characteristics for a given size tire which is expected to accept a given load condition, a selection of cord material is initially made, the diameter, number of filaments, twist etc. of the individual cords are determined, and the spacing between the individual cords (ends per inch) is varied to adjust the ultimate strength of the completed body ply. Increased strength requirements for the body ply may further be provided by constructing the body ply of a plurality of superimposed layers of the reinforcing fabric, i.e., the sheet of rubber enclosing the plurality of space tire cords.

The process presently used to produce radial tire body plies, and for that matter reinforcing fabric for body plies and/or belts for radial as well as bias ply tires, consists of the use of a so-called "calender line". In this process, compounded uncured rubber is conveyed to a three or four roll calender which works the uncured rubber into a sheet or film form. The individual tire cords are set side by side, ranging from 10 to 25 ends per inch, and are fed to the rollers of the calender which then presses the sheet or film of uncured rubber onto the tire cords. Generally a calender of this type is 60 to 140 inches in width, and uses temperature controlled steel rolls ranging from 40 to 100 inches in diameter.

The individual tire cords are fed into the calender rolls from a creel room having hundreds of spools of individual tire cords. The spacing and tension of the cords are controlled by highly technical mechanical means, and the rubber or sheet form thickness is controlled by precision adjustment of the nip or space between the calender rolls.

The calendering operation produces properly spaced tire cords surrounded by uncured rubber in a continuous sheet with the tire cord extending along the length of the sheet and with the sheet having a thickness ranging from about 0.03 to 0.15 inches. The resulting sheet of calendered tire cord, i.e., the reinforcing fabric, is then formed into a large roll, usually after applying a plastic protective backing film in order to allow for subsequent unrolling. The reinforcing fabric is later unrolled and cut into sections or pieces of appropriate width and length depending on the size and type of tire to be constructed. For example, for radial tires, the sections to be utilized for the body ply are cut at 90° to the length of the sheet.

As can easily be appreciated, the equipment required to accomplish the above calendering process is massive, costly, and requires considerable skill on the part of the calendering and cutting operators to produce uniform and acceptable body plies. Additionally, the calendering process presents difficulties when making any change from one type of tire cord to another or when changing the end count to accomplish a different strength rating of the finished tire. Moreover, the present practices, including the calendering operation, for making body plies are essentially limited to the use of pretwisted or bundled tire cords, i.e., the calendering process is not generally applicable to the use of individual filaments, for example, individual steel filaments, as the reinforcing element of the tire fabric since, in view of the greatly increased number of filaments required in order to provide the desired strength, the size and cost of the calendering line would be increased many fold. The use of twisted or cabled tire cord, however, as opposed to individual filaments, substantially increases the cost of material for the tire since a pretwisted tire cord costs nearly twice that of the untwisted filaments contained in the same cord.

Finally, another problem area with the present commonly employed practice of making body plies for radial tires is the splicing together of the ends of the section of reinforcing fabric on a tire building drum prior to the application of the bead wires. Due to the fact that the cords are placed side by side, it is often necessary to overlap the cords during the splicing operation, resulting in a narrow area of increased thickness which is undesirable. Alternatively, when butt splices are employed, a weakness is often created in the body ply which permits the cords to separate beyond acceptable standards when the tire is expanded into the final polaroid position.

In order to avoid the need for calendering when producing the reinforcing fabric, and to permit the use of individual filaments, for example, steel filaments, it is known in the art to form the reinforcing fabric from an extruded ribbon of uncured elastomeric material, for example, rubber, having steel filaments embedded therein. For example, see U.S. Pat. No. 3,778,329 issued Dec. 11th, 1973 to S. W. Alderfer. According to the teachings of this patent, which is directed to a belted/bias-ply tire but additionally teaches that belts for radial tires may be similarly manufactured, the extruded ribbon is placed on the surface of the drum so that successive wraps of the ribbon are contiguously wound so as to produce an annulus of predetermined size. The annulus is then helically slit to form the desired ply. While the teachings of this patent would appear to overcome some of the problems involved with a calendering process, this patent is not directed to the manufacture of radial tires, and sheets of reinforcing fabric formed according to the teachings of this patent would not be applicable for the body ply of a radial tire. Additionally, the teachings of this patent do not overcome many of the problems mentioned above relative to radial tires, and moreover, according to the specific teachings of this patent, the individual steel filaments must delineate a cylindrically helical path through the ribbon, and thus through the fabric, producing additional problems during the manufacturing process.

SUMMARY OF THE INVENTION

It is therefore a primary object of the present invention to provide an improved method of producing the body ply for a radial tire which does not require calendering and thus the need for the expensive and massive equipment involved in this operation.

It is a further object of this invention to provide a method of producing a body ply for a radial tire which permits great flexibility in changing the type of tire cord, and the ends per inch processed, by means of substituting and changing only a relatively few spools of tire cords.

It is still another object of the present invention to provide a method of producing the body ply for a radial tire which permits the use of either twisted cord or cable or individual filaments, and in particular steel filaments, as the cord or reinforcing elements for the fabric of the body ply.

It is still a further object of the present invention to provide a method of producing a body ply for a radial tire whereby each individual body ply is individually directly made to the desired precise size as to width, length and thickness.

It is still another object of the invention to provide a method for producing a body ply for a radial tire whereby the ends of the body ply may be easily and readily spliced or joined together, retaining full strength in the spliced area, by means of overlapping and interlocking end portions.

Finally, it is an object of the present invention to provide an improved body ply for a radial tire which utilizes only straight parallel steel filaments as the reinforcing elements of the reinforcing fabric.

The above objects are basically achieved in that according to the method of the invention, a continuous ribbon of a uncured elastomeric material having a plurality of spaced substantially parallel reinforcing means embedded therein and extending along the length thereof is initially formed and this ribbon is helically wound on a cylindrical drum so that successive turns or wraps of the ribbon overlap one another to form a cylinder having a wall thickness which is greater than the thickness of the ribbon. The helical winding is discontinued and the ribbon is severed when the length of the wound cylinder is approximately equal to the circumference of the tire bead of the radial tire to be produced. The wound ribbon is then removed from the drum and flattened to form a sheet of material of the length of the wound cylinder, after which the sheet is formed into a further cylinder whose longitudinal axis is transverse to the longitudinal axis of the sheet and the two juxtaposed ends of the sheet are joined or spliced together to form the body ply of the radial tire.

The ribbon used according to the preferred embodiment of the invention is approximately ⅛ to ¾ inches in width and adjacent turns of the helically wound ribbon overlap by at least on-half of the width of the ribbon.

According to one embodiment of the method of the invention, the wound ribbon is removed from the drum by cutting the wall of the wound cylinder along a straight line perpendicular to the longitudinal axis of the reinforcing means of the ribbon, i.e., the cords or filaments. This greatly simplifies the prior art methods in that no helical cutting of the reinforcing fabric is required.

According to a further embodiment of the method of the invention, the wound cylinder of material is removed from the drum, for example, by collapsing the drum, and the cylinder is collapsed on itself to form the flat elongated sheet which has a thickness twice that of the wall of the wound cylinder. In addition to providing a body ply which directly is twice as thick as the originally constructed reinforcing fabric, this method of the invention has the advantage that no cutting or shearing operation is involved in the manufacture of the body plies, and thus there are no exposed cut ends of the reinforcing elements of the fabric, which as is known, can cause adherence problems in the finished tire particularly when the reinforcing means or elements are steel cords or steel filaments.

Both embodiments of the method according to the invention have the advantage that as a result of the overlapping helical winding of the ribbon, both ends of the flattened sheet will have a thickness substantially equal to the thickness of the ribbon, and thus less than the thickness of the remainder of the sheet. Consequently, when the two ends are spliced together, they may be overlapped to provide a splice which is substantially the thickness of the remainder of the sheet. Preferably, in order that these overlapping end portions engage in a substantially interlocking manner, the ribbon is wound on the drum with a complete whole number of turns, i.e., the ribbon is severed at the end of a complete turn. Preferably, in the embodiment of the method of the invention wherein the wound cylinder is collapsed on itself, in order to provide a more favorable interlocking relationship between the two ends of the resulting flattened sheet, the cylinder is flattened so that the beginning and the end of the wound ribbon forming the cylinder are located along one longitudinal edge of the resulting sheet.

BRIEF DESCRIPTION OF THE DRAWINGS

FIG. 1 is a schematic plan view of an apparatus for forming the reinforcing fabric for the body ply of a radial tire according to the method of the invention.

FIG. 2 is an enlarged sectional view along the lines 2—2 of FIG. 1 showing the reinforcing fabric according to the invention in a simplified form.

FIG. 3 is a plan view of a wound cylinder of the reinforcing fabric according to the invention for the body of a radial tire after removal from the winding drum accordingly to one embodiment of the method of the invention.

FIGS. 4 and 5 are schematic illustrations showing the collapse of the cylinder of FIG. 3 in order to form the flat sheet of reinforcing fabric according to one embodiment of the method of the invention.

FIG. 6 is a plan view of the flattened sheet of reinforcing fabric resulting from the operations of FIGS. 4 and 5, with the surface of the sheet being partially cut away to show the relationship between the upper and lower layers of the sheet.

FIG. 7 is an elevational view of the sheet of FIG. 6 after the two ends have been spliced and the bead wires positioned.

FIG. 8 is a schematic enlarged cross-sectional view illustrating the interlocking relationship between the two ends of the sheet of FIG. 6 prior to splicing to form the cylinder of FIG. 7.

DETAILED DESCRIPTION OF THE PREFERRED EMBODIMENTS

Figure 9:
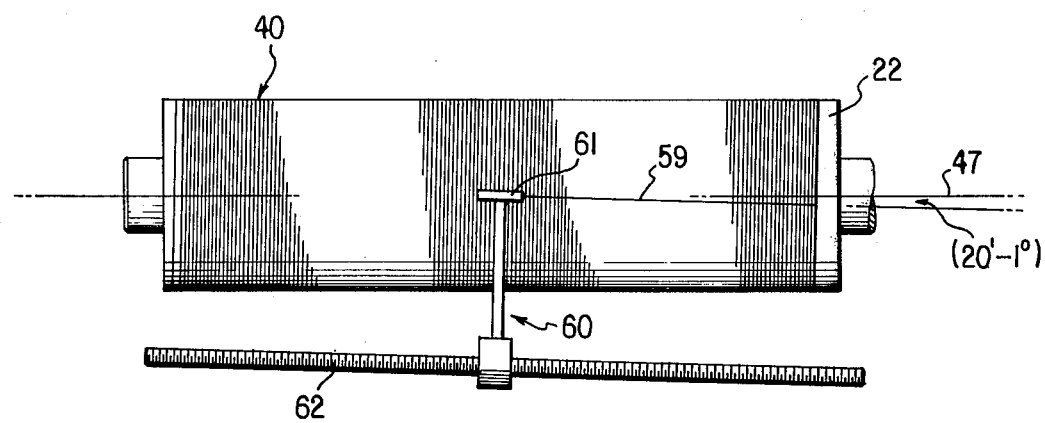
FIG. 9 is a schematic view used to explain a further embodiment of the method according to the invention.

As indicated above, instead of forming the reinforcing fabric for the body ply of a radial tire by a large scale calendering operation to form a large sheet of the reinforcing fabric and then by cutting the sheet to the desired size, according to the present invention the reinforcing fabric is basically formed to the desired size by wrapping a narrow ribbon of uncured elastomeric material, preferably rubber, having a plurality of parallel reinforcement elements embedded therein about a drum. Although conceivably a small scale calendering operation could be utilized to form the ribbon, preferably as shown in FIG. 1, the ribbon 10 is formed by an extrusion process. In order to form the ribbon 10, a plurality of equally spaced parallel tire reinforcing elements 11 are fed to the cross-head 13 of a cold feed extruder 14 to which is fed uncured rubber strip stock 15. In the cross-head 13, each of the reinforcing elements 11 is impregnated with the warm uncured or green rubber and then passed through a die placed in the downstream or outlet opening of the cross-head 13 in order to provide the ribbon 10 with its desired dimensions. According to the present invention the die (not shown) in the cross-head 13 has a substantially rectangular opening to provide a continuous ribbon 10 having a thickness from approximately 0.020 to 0.120 inches and a width ranging from approximately one-eighth to three-quarters of an inch, i.e., a relatively thin and narrow ribbon, depending on the type and size tire being produced.

The individual reinforcing elements 11 fed to the cross-head 13 originate in a small creel room 16 (which in a conventional manner is preferably provided with temperature and humidity control) wherein each of the reinforcing elements 11 is supplied from an individual spool 17. The number of individual reinforcing elements contained in the ribbon 10, and hence a number of spools 17 required in the creel room 16 would range from about 2 to 50 reinforcing elements 11 depending on the strength and reinforcement required for the type and size radial tire body being constructed.

Although any of the known tire cord materials such as steel, polyester, rayon or nylon, csn be used for the reinforcing elements 11, and although each of the reinforcing elements 11 could, if desired, be a twisted cable formed of a plurality of filaments of one of the above-mentioned materials, according to the present invention each of the reinforcing elements 11 is preferably a single straight filament formed of steel of the type commonly used for the construction of pneumatic tires. As is conventional, the steel filament is provided with a suitable coating, for example, bronze or brass, in order to assure satisfactory adhesion between the filament and the elastomeric material, which in the described embodiment of the invention is preferably rubber. The individual steel filaments are preferably relatively thin, for example, having a diameter in the order of 0.007 inches. In order to maintain the individual steel filament reinforcing elements 11 at an equal spacing and parallel to one another as they pass through the cross-head 13, the steel filaments or reinforcing elements 11 pass over a roller 18, which has a plurality of minute equally spaced grooves (one of each of the filaments) on its surface, prior to entering the cross-head 13.

The ribbon 10 of uncured rubber with the equally spaced parallel steel filaments 11 extending along the length thereof which exits from the cross-head 13 is fed by a pair of application rollers 20 and 21 to a drum 22. The ribbon 10 is applied to the surface of the drum and helically wound on the drum, with a pitch angle of a maximum of approximately 1°, so that successive or adjacent turns or wraps of the ribbon 10 overlap one another by at least one-half of the width of the ribbon. For example, with a ribbon ¼ inch in width, the successive turns of the ribbon uniformly helically wound about the drum 22 would overlap one another by at least one-eighth of an inch. A reinforcing fabric formed in this manner on the surface of the drum 22 with an overlap of one-half of the width of the ribbon is shown schematically in FIG. 2. It is of course, understood, that an overlap of greater than one-half of the width of the ribbon, for example, an overlap of two-thirds or three-quarters of the width of the ribbon 10 is possible, and under certain circumstances may be desired.

In order to accomplish the helical and overlapping winding of the ribbon 10 about the surface of the drum 22, the drum 22 is mounted so that it is rotatable about its longitudinal axis and additionally is translatable along its longitudinal axis relative to the applicating roller 21. In the illustrated embodiment, the drum 22 is mounted by means of a shaft 23 on a carriage 24 so that it is rotatable about its longitudinal axis. The carriage 24 in turn is mounted on a pair of rotatable lead screws 25, 26 so that the carriage 24 and the drum 22 are movable along the longitudinal axis of the drum 22, and thus laterally relative to the application roller 21, which in the illustrated embodiment is fixed on a base support 28. The drum 22 is rotated at a constant speed by means of a motor (not shown) connected to one end of the shaft 23, for example, by means of the gear 30. In order to provide the helical winding of the ribbon 10 about the surface of the drum 22 with the desired overlapping arrangement, the speed of rotation of the lead screws 25, 26, which are likewise continuously rotating, is synchronized to that of the speed of rotation of the drum 22 so that the axial translation of the drum 22 per revolution of the drum 22 is directly related to the amount of overlap desired between adjacent turns of the helical winding. For example, with the ¼ inch wide ribbon 10 and the desired overlap of one-half of this width, the drives for the drum 22 and the carriage 24 are synchronized such that the carriage 24 moves ⅛ inch in the direction of the arrow 31 for each revolution of the drum 22. Similarly, if an overlap of three-quarters of the width of the ¼ inch wide tape 10 is desired, then the translation in the direction of the arrow 31 per revolution of the drum 22 would be one-sixteenth of an inch. Drive and gearing arrangements for accomplishing this type of relationship between the rotational and translational movements are well known in the art, and need not be described in any greater detail.

The helical winding of the ribbon 10 about the surface of the drum 22 is continued until a cylinder is formed whose length is approximately equal to the desired inner diameter of the tire bead of the radial tire to be formed. At that time the ribbon 10 is severed in any convenient manner. Preferably the ribbon 10 is severed after the end of a complete turn or wrap of the ribbon 10 about the drum 22.

Due to the overlapping nature of the windings of the ribbon 10, the wall thickness of the wound cylinder on the drum 22 will be greater than that of the thickness of the ribbon 10 itself. As shown in FIG. 2, which shows the minimum degree of overlap according to the invention, i.e., one-half of the width of the ribbon 10, the wall thickness of the wound cylinder, will be approximately twice that of the ribbon 10. This in effect provides a reinforcing fabric compound of two layers of the ribbon 10. It should of course be understood that if a greater degree of overlap is utilized the wall thickness will be accordingly greater. For example, with an overlap of three-fourths of the width of the ribbon 10, the wall thickness of the wound cylinder will be approximately four times as great as that of the ribbon 10 itself. It should further be understood that the scale of FIG. 2 is greatly exaggerated, and hence the irregularity in the surface of the cylinder wall caused by the thickness of the ribbon 10 is likewise exaggerated. While this irregular surface would not appear to present any real problem in an actual tire, the irregularity of the surface may be substantially avoided by providing a pressure roller on the support frame 28 opposite the application roller 21 to stitch the successive turns of the ribbon 10 together in a known manner, and thus cause the formed cylinder to have a substantially smooth inner surface by the substantial elimination of the apparent spaces 33. Of course, in such case, a distortion of the rectangular cross-section for the ribbon 10 would result.

After the winding of the wound cylinder of ribbon 10 on the drum 22 is completed, the next step in the formation of the body ply is the removal of the wound cylinder of ribbon 10 from the drum 22 and the flattening of the cylinder to form a flat sheet of reinforcing fabric with the filaments 11 extending substantially transverse to the longitudinal direction of the sheet. This may be accomplished in a number of different ways.

According to the embodiment of the method of the invention illustrated in FIGS. 3 to 6, the complete wound cylinder 40 of ribbon 10 formed on the drum 22 is removed intact (FIG. 3) from the drum 22, for example, by utilizing a collapsible drum of the type well known in the tire building art for the drum 22, and the cylinder 40 is then flattened on itself to produce the flat sheet of reinforcing fabric. As shown schematically in FIG. 4, this may be accomplished by placing the wound cylinder 40 between two parallel plates 41 and 42 of a press and then by applying sufficient pressure in the direction of the arrows 43 and 44. As shown in FIG. 5, this will cause the cylinder 40 to be collapsed on itself to form the flat sheet of reinforcing fabric 45 which is shown in plan view in FIG. 6. Since the elastomeric material of the wound cylinder 40 is still at this time in the uncured state, the resulting flat sheet of reinforcing fabric 45 will be a contiguous sheet having a thickness, in the specifically described embodiment of the invention, approximately four times that of the thickness of the ribbon 10. Although not shown, it is to be understood that in the actual press utilized to flatten the cylinder as shown in FIG. 5, the space between the plates 41 and 42 is preferably sealed and evacuated prior to the application of the final pressure in order to avoid the entrapment of air within the interior of the flat sheet 45.

The flat sheet of reinforcing fabric 45 of FIG. 6 is then transported to a conventional tire building drum (not shown) wherein the sheet 45 is formed into a further cylinder whose longitudinal axis 46 (FIG. 7) is transverse to the longitudinal axis 47 of the sheet 45, and hence the longitudinal axis of the cylinder 40 (FIG. 3), by splicing the two ends 50 and 51 of the sheet 45 together. As shown in FIG. 7, the bead wires 52 and 53 are placed on the ends of this further cylinder, which forms the desired body ply or carcass for the radial tire, and then the remainder of the tire is constructed in the usual manner.

It should be noted, that in view of the particular manner in which the cylinder 40 was formed from the ribbon 10, i.e., by overlapping of successive turns or wraps of the ribbon 10, a significant advantage is realized when joining or splicing the two ends 50 and 51 together to form the final body ply for the radial tire. That is, as a result of the overlapping relationship between successive turns of the ribbon 10, and depending on the degree of overlap utilized, at least one-half of the width of the portion of both the initial and the final turn of the ribbon 10 immediately adjacent the two ends 50' and 51' of the cylinder 40 will have a thickness which is less than that of the remainder of the wall of the cylinder 40. This relationship will be maintained when the cylinder 40 is flattened to the sheet 45 so that as shown in FIG. 8, the two ends 50 and 51 of the sheet 45 will have a thickness which is substantially one-half that of the remainder of the sheet. Consequently, the two ends 50 and 51 may be readily overlapped when splicing same together, without producing substantially any undesirable increased thickness at the location of the weld. Additionally, since as indicated above, the winding of the ribbon 10 was discontinued and the ribbon severed only at the end of a complete turn, the thinner portions of the ends 50 and 51 of the sheet 45 will in effect be mirror images of one another when they are juxtaposed (see FIG. 8), so that they can effectively engage, when overlapped, in an interlocking manner to form a completed body ply or carcass of a substantially uniform thickness throughout. When the embodiment of the invention shown in FIGS. 3 to 6 to utilized to form the body ply, preferably the cylinder 40 is flattened on itself in such a manner that the two ends 54 and 55 of the ribbon 10 lie substantially along a longitudinal edge of the sheet 45. In this manner, the interlocking engagement of the ends 50 and 51 is achieved in a much simplier and more satisfactory manner.

The embodiment of the invention shown in FIGS. 3 to 6 has the decided advantage that, since no cutting or shearing operation, other than at the beginning and end 54 and 55 respectively of the ribbon 10, is required in order to form the sheet 45, there will be substantially no exposed cut ends of the steel filaments in the completed body ply to cause the adhesion problems present in the state of the art tires utilizing steel filaments or cords as the reinforcing elements. Additionally, as illustrated in FIG. 6, due to the manner in which the sheet 45 is formed, there is in effect produced a two layered sheet of reinforcing fabric with the filaments 11 in each of the sheets extending at a slight bias, i.e., 1° or less, to the edges of the sheet, and with the filaments 11 in the upper and lower layers extending in opposite bias angles relative to one another. This results from the helical winding of the ribbon 10 and the subsequent collapse of the cylinder 40. This slight bias angle with opposite sense in the two layers should result in a greater ease in expanding the body ply into the final torrous shape when the processing of the cylinder of FIG. 7 is completed in the conventional manner to form the radial tire.

According to a modification of the invention, instead of removing the wound cylinder 40 in tact from the drum 22 and collapsing the cylinder 40 on itself to form the flat sheet 45, according to a modification of the invention the cylinder 40 is cut along a straight line extending in the longitudinal direction of same prior to removal from the drum 22. As shown in FIG. 9, this may be accomplished simply by means of a cutting tool 60 mounted on the carriage 24 so that it may traverse the length of the drum 22. This may be accomplished, for example, by mounting the actual cutting device 61 on a rotatable lead screw 62, so that the cutting device 61 traverses the length of the drum 22, which is stationary, to cut the cylinder 40 along a straight line. Preferably, the lead screw 62 is slightly inclined with regard to the longitudinal axis of the drum 22 (20'-1°), and hence of the cylinder 40, to cause the straight line cut to be substantially perpendicular to the direction of the individual filaments 11 contained in the cylinder 40.

After cutting of the cylinder 40, the cut cylinder 40 may be simply removed from the drum 22 and flattened to form a flat sheet of reinforcing fabric which would then be further processed in the same manner as in the previously described embodiment. Of course, if a drum 22 of the same diameter were utilized for both embodiments of the invention, the flattened sheet produced according to the latter embodiment would be twice as wide as the sheet 45, but would be half as thick. This larger sheet could then either be folded in half to form a sheet of the width of the sheet 45, if a double layer thickness of the reinforcing fabric is required, or could be simply severed to form two individual sheets of reinforcing fabric each of the width of the sheet 45. However, in order to avoid any need for handling such larger sheets of the reinforcing fabric, preferably after cutting the cylinder 40 as shown in FIG. 9, the drum 22 is rotated by 180° and a second similar cut is made. Thus, two sheets of reinforcing fabric of the correct size for the body ply are produced from each cylinder 40 which may then be used individually for the production of two tires with a single layer thickness if such will produce the required strength for the tire, or the two sheets may be superimposed if a double layer thickness is required.

The latter embodiment of the method according to the invention, i.e., the embodiment wherein the cylinder 40 is cut while on the drum 22, will possess substantially all of the advantages of the embodiment of the method described in connection with FIGS. 4 to 6 with, of course, the exception that exposed ends for the reinforcing elements in the body ply will occur. This latter embodiment, however, possesses the advantage that no additional processing of the reinforcing fabric is required between the time the fabric is removed from the drum 22 and the time the construction of the radial tire on the building drum is initiated. Regardless of which embodiment of the invention is utilized, substantial savings and advantages over the presently used methods of forming body plies for radial tires would appear to be realized, particularly when individual steel filaments are utilized for the reinforcing elements.

It will be understood that the above description of the present invention is susceptible to various modifications, changes and adaptations, and the same are intended to be comprehended within the meaning and range of equivalents of the appended claims.

What is claimed is:

1. A method of forming a body ply for a radial tire comprising the steps of:
    forming a continuous ribbon of an uncured elastomeric material having a plurality of mutually spaced substantially parallel individual straight steel wire filament reinforcing means which are embedded in and completely encased by the elastomeric material and which extend along the length of the ribbon;
    helically winding the continuous ribbon on a cylindrical drum with each successive turn of the ribbon overlapping a portion of the immediately preceding turn to form a cylinder of reinforced elastomeric sheet material whose thickness is greater than the thickness of the ribbon;
    discontinuing the winding and severing the ribbon when the length of the wound cylinder is approximately equal to the circumference of the tire bead of the radial tire to be formed;
    removing the sheet material from the drum and flattening same to provide at least one flat sheet of reinforced elastomeric material whose length is equal to and in the direction of the length of the wound cylinder;
    forming said at least one flat sheet into a further cylinder whose longitudinal axis is transverse to the longitudinal axis of said at least one flat sheet; and
    joining the two juxtaposed ends of said at least one flat sheet together to form the body ply of a radial tire.

2. The method defined in claim 1 wherein said step of removing includes cutting the wall of the wound cylinder of sheet material along at least one straight line perpendicular to the longitudinal axis of the reinforcing means.

3. The method as defined in claim 1 wherein said step of removing and flattening comprises: removing the wound cylinder of material from the drum and collapsing said cylinder on itself to form a flat elongated sheet of a thickness twice that of the wall of the wound cylinder.

4. The method as defined in claim 1 further comprising placing a bead wire ring around each end of said further cylinder and folding each end of said further cylinder over the associated bead wire ring.

5. A method as defined in claim 1 wherein said ribbon is approximately ⅛ to ¾ inches in width.

6. A method as defined in claim 5 wherein said step of forming ribbon comprises drawing a plurality of substantially parallel steel wire filaments under tension through the head of a cross-head extruder while coating same with said elastomeric material.

7. A method as defined in claim 1 wherein successive turns of said helical winding overlap by at least one-half of the width of said ribbon.

8. A method as defined in claim 1 wherein said step of joining includes overlapping the ends of flat sheet and stitching same together to form an overlapping joint.

9. A method as defined in claim 8 wherein said step of discontinuing the winding and severing the ribbon is carried out only at the end of a completed turn of the ribbon about the drum, whereby the two ends of said flat sheet will have portions which are thinner than the remainder of the flat sheet and which will substantially matingly engage in an interlocking manner when overlapped; and wherein said step of overlapping includes overlapping only the thinner portions of the ends of the flat which interlockingly engage whereby the thickness of the further cylinder in the area of the overlapping joint will be substantially that of the remainder of said further cylinder.

10. A method as defined in claim 9 wherein said step of removing and flattening comprises: removing the wound cylinder of material from the drum and collapsing said cylinder on itself to form a flat elongated sheet of a thickness twice that of the wall of the wound cylinder and with the two ends of the ribbon being disposed along a longitudinal edge of the flat sheet.

11. A method as defined in claim 2 wherein said step of cutting includes cutting the wall of the wound cylinder of sheet material along two straight lines which are each perpendicular to the longitudinal axis of the reinforcing means and are displaced from one another by 180° whereby after flattening two of said flat sheets of reinforced elastomeric material will be provided.

12. A method as defined in claim 1 wherein said ribbon is helically wound on the drum with a constant pitch.

13. A method of forming a body ply for a radial tire comprising the steps of:

providing a continuous narrow ribbon of an uncured elastomeric material having a plurality of mutually spaced substantially parallel individual straight steel wire filaments which are embedded in and completely encased by the elastomeric material and which extend along the length of the ribbon;

forming said ribbon into a sheet of reinforced elastomeric material of a thickness greater than that of the ribbon and of a desired width and length by (a) applying said ribbon to a support so that successive equal length sections of the ribbon are parallel, and extend substantially perpendicular to the length of the sheet of material with each successive equal length section of the ribbon overlapping at least one half of the width of the immediately preceding equal length section of the ribbon, and (b) discontinuing said step of applying when the length of the sheet is approximately equal to the circumference of the tire bead of the radial tire to be formed;

removing the sheet of material from the support and forming same into a cylinder whose longitudinal axis is substantially parallel to the steel wire filaments in the sheet of material; and joining the two juxtaposed ends of the sheet together to form the body ply of a radial tire.

14. A method as defined in claim 13 wherein said ribbon is approximately one eighth to three-quarters of an inch in width.

15. A method as defined in claim 13 wherein said ribbon has a thickness of approximately 0.020 to 0.120 inches.

16. A reinforced fabric for a pneumatic tire comprising: a body of elastomeric material formed of a plurality of substantially parallel narrow ribbons of elastomeric material with each said ribbon partially overlapping the adjacent ribbon by at least one half of its width so that the thickness of said fabric is greater than the thickness of each individual ribbon; and a plurality of spaced substantially parallel individual straight brass plated steel filaments completely embedded in each of said ribbons and extending along the length of same.

17. A radial tire having a body ply formed of a reinforced fabric as defined in claim 16.

18. In a method of forming a body ply for a radial tire comprising the steps of: forming a continuous ribbon of an uncured elastomeric material having a plurality of mutually spaced substantially parallel reinforcing means which are embedded in and completely encased by the elastomeric material and which extend along the length of the ribbon; helically winding the continuous ribbon on a cylindrical drum with each successive turn of the ribbon overlapping a portion of the immediately preceding turn to form a cylinder of reinforced elastomeric sheet material whose thickness is greater than the thickness of the ribbon; discontinuing the winding and severing the ribbon when the length of the wound cylinder is approximately equal to the circumference of the tire bead of the radial tire to be formed; removing the sheet material from the drum and flattening same to provide at least one flat sheet of reinforced elastomeric material whose length is equal to and in the direction of the length of the wound cylinder; forming said at least one flat sheet into a further cylinder whose longitudinal axis is transverse to the longitudinal axis of said at least one flat sheet; and joining the two juxtaposed ends of said at least one flat sheet together to form the body ply of a radial tire; the improvement wherein: said step of discontinuing the winding and severing the ribbon is carried out only at the end of a completed turn of the ribbon about the drum, whereby the two ends of said flat sheet will have portions which are thinner than the remainder of the flat sheet and which will substantially matingly engage in an interlocking manner when overlapped; and said step of joining includes overlapping only the thinner portions of the ends of the flat sheet which interlockingly engage and stitching the ends together to form an overlapping joint whereby the thickness of the further cylinder in the area of the overlapping joint will be substantially that of the remainder of said further cylinder.

19. A method as defined in claim 18 wherein said step of removing and flattening comprises: removing the wound cylinder of material from the drum and collapsing said cylinder on itself to form a flat elongated sheet of a thickness twice that of the wall of the wound cylinder and with the two ends of the ribbon being disposed along a longitudinal edge of the flat sheet.

* * * * *